(12) United States Patent
Liu

(10) Patent No.: US 10,492,531 B2
(45) Date of Patent: Dec. 3, 2019

(54) INFORMATION PUSHING METHOD AND COMMUNICATION SYSTEM

(71) Applicant: HUIZHOU KIMREE TECHNOLOGY CO., LTD., SHENZHEN BRANCH, Shenzhen (CN)

(72) Inventor: Qiuming Liu, Huizhou (CN)

(73) Assignee: HUIZHOU KIMREE TECHNOLOGY CO., LTD., SHENZHEN BRANCH, Shenzhen (CN)

( * ) Notice: Subject to any disclaimer, the term of this patent is extended or adjusted under 35 U.S.C. 154(b) by 484 days.

(21) Appl. No.: 15/362,628

(22) Filed: Nov. 28, 2016

(65) Prior Publication Data

US 2017/0071262 A1 Mar. 16, 2017

Related U.S. Application Data

(63) Continuation of application No. PCT/CN2014/078604, filed on May 28, 2014.

(51) Int. Cl.
| | |
|---|---|
| *H04W 4/02* | (2018.01) |
| *A24F 47/00* | (2006.01) |
| *H04L 29/08* | (2006.01) |
| *H04M 1/725* | (2006.01) |
| *H04W 4/21* | (2018.01) |

(52) U.S. Cl.
CPC ........... *A24F 47/008* (2013.01); *A24F 47/00* (2013.01); *H04L 67/26* (2013.01); *H04M 1/72527* (2013.01); *H04W 4/023* (2013.01); *H04W 4/21* (2018.02); *H04M 1/7253* (2013.01)

(58) Field of Classification Search
CPC ........ A24F 47/008; A24F 47/00; H04W 4/21; H04W 4/023; H04L 67/26; H04M 1/72527; H04M 1/7253
See application file for complete search history.

(56) References Cited

U.S. PATENT DOCUMENTS

| | | | | |
|---|---|---|---|---|
| 2014/0190496 | A1* | 7/2014 | Wensley | A24F 47/008 131/273 |
| 2014/0246035 | A1* | 9/2014 | Minskoff | A24F 47/008 131/329 |
| 2015/0320116 | A1* | 11/2015 | Bleloch | A61M 15/06 219/628 |

FOREIGN PATENT DOCUMENTS

| | | |
|---|---|---|
| CN | 103458354 A | 12/2013 |
| CN | 103653261 A | 3/2014 |
| CN | 103734916 A | 4/2014 |

\* cited by examiner

*Primary Examiner* — Chuong A Ngo
(74) *Attorney, Agent, or Firm* — Schwabe Williamson & Wyatt, PC (57) ABSTRACT

An information pushing method and a communication method are provided. The information pushing method includes: detecting, by an electronic cigarette, a behavior characteristic of a user; generating, by the electronic cigarette, a triggering signal if the behavior characteristic of the user satisfies a predetermined condition; transmitting, by the electronic cigarette, the triggering signal to a user terminal bound to the electronic cigarette; performing positioning, by the user terminal, and transmitting position information of the user terminal to a service platform; and judging, by the service platform, whether user satisfies an interaction condition according to the received position information of the user terminal; and pushing a group message to the user terminal, if the user satisfies the interaction condition.

20 Claims, 5 Drawing Sheets

INFORMATION PUSHING METHOD AND COMMUNICATION SYSTEM

CROSS-REFERENCES TO RELATED APPLICATION

This application is a continuation of PCT/CN2014/078604, filed on May 28, 2014 and titled "INFORMATION PUSHING METHOD AND COMMUNICATION SYSTEM", which is incorporated herein by reference in its entirety.

FIELD

The present disclosure relates to the technical field of communication, and in particular to an information pushing method and a communication system.

BACKGROUND

Electronic cigarette is an innovative electronic product, which has an appearance and smell similar to that of a conventional cigarette, but is healthy and environmental-friendly for people.

With the increasing number of users of the electronic cigarette, more demands are made on the function of the electronic cigarette. An intelligent electronic cigarette including a wireless communication module and a control module is disclosed in the Chinese application No. 201310684449.X. Smoking parameters may be encoded by the control module into a smoking parameter file in compliance with a wireless communication protocol. The smoking parameter file may be decoded into a smoking parameter signal and transmitted to an intelligent terminal by the control module by using the wireless communication module, thereby enabling a real-time or timing interaction between the control module and the intelligent terminal.

In the above technology, although interaction is enabled between the user and the electronic cigarette, the interaction is limited to a user understanding his/her smoking condition, and the interaction of information between users cannot be achieved.

SUMMARY

According to the embodiment of the present disclosure, there is provided an information pushing method and a communication system, for achieving interaction of information between multiple users.

An information pushing method according to an embodiment of the present disclosure includes:

detecting, by an electronic cigarette, a behavior characteristic of a user;

generating, by the electronic cigarette, a triggering signal if the behavior characteristic of the user satisfies a predetermined condition;

transmitting, by the electronic cigarette, the triggering signal to a user terminal bound to the electronic cigarette;

performing positioning, by the user terminal, and transmitting position information of the user terminal to a service platform; and judging, by the service platform, whether the user satisfies an interaction condition according to the received position information; and pushing a group message to the user terminal, if the user satisfies the interaction condition.

Optionally, the method may further include:

judging, by the electronic cigarette, whether the user is smoking; and determining that the behavior characteristic of the user satisfies the predetermined condition, if the user is smoking.

Optionally, generating, by the electronic cigarette, a triggering signal may include:

generating, by a sensor in the electronic cigarette, a pulse signal and transmitting the pulse signal to a processor in the electronic cigarette; and generating, by the processor in the electronic cigarette, a triggering signal according to the pulse signal, for indicating that the user is smoking the electronic cigarette.

Optionally, the sensor is an airflow sensitive switch or a key switch, and the key switch is a light-touch switch or a sensitive switch.

Optionally, before transmitting, by the electronic cigarette, the triggering signal to a user terminal bound to the electronic cigarette, the method may further include:

judging, by the electronic cigarette, whether a client application in the user terminal is operating; and triggering the electronic cigarette to transmit the triggering signal to the user terminal bound to the electronic cigarette, if the client application in the user terminal is operating.

Optionally, judging, by the electronic cigarette, whether a client application in the user terminal is operating include:

transmitting, by the electronic cigarette, a client detecting massage to the user terminal;

judging, by the electronic cigarette, whether a client response message replied by the user terminal is received; and determining that the client application in the user terminal is operating, if the client response message replied by the user terminal is received.

Optionally, judging, by the service platform, whether the user satisfies an interaction condition according to the received position information include:

judging, by the service platform, whether a distance between the user and other user is smaller than a preset distance according to the position information; and determining that the user satisfies the interaction condition, if the distance between the user and other user is smaller than the preset distance.

Optionally, the method may further include:

collecting, by the electronic cigarette, a smoking parameter of the user, and transmitting the smoking parameter to the user terminal, if the behavior characteristic of the user satisfies the predetermined condition.

Optionally, before performing positioning, by the user terminal, the method further includes:

judging, by the user terminal, whether a difference between a time when the user last smokes and a current time is smaller than a preset value according to the smoking parameter; and triggering the user terminal to perform the positioning, if the difference between the time when the user last smokes and the current time is smaller than the preset value; or judging, by the user terminal, whether a frequency of the user smoking in a predetermined period of time is larger than a preset value according to the smoking parameter; and triggering the user terminal to perform positioning, if the frequency of the user smoking in the predetermined period of time is larger than the preset value.

Optionally, after collecting, by the electronic cigarette, a smoking parameter of the user, and transmitting the smoking parameter to the user terminal, the method further comprises:

transmitting, by the user terminal, the smoking parameter to the service platform;

where judging, by the service platform, whether the user satisfies an interaction condition according to the received position information include:

judging, by the service platform, whether the user satisfies the interaction condition according to the smoking parameter and the position information.

Optionally, judging, by the service platform, whether the user satisfies an interaction condition according to the smoking parameter and the position information may include:

judging, by the service platform, whether a distance between the user and other user is smaller than a preset distance according to the position information, judging whether a difference between a time when the user last smokes and a current time is smaller than a preset value according to the smoking parameter if the distance between the user and other user is smaller than the preset distance according to the position information, and determining that the user satisfies the interaction condition if the difference between the time when the user last smokes and the current time is smaller than the preset value; or judging, by the service platform, whether a distance between the user and other user is smaller than a preset distance according to the position information, judging whether a frequency of the user smoking in the predetermined period of time is larger than a preset value according to the smoking parameter if the distance between the user and other user is smaller than the preset distance according to the position information , and determining that the user satisfies the interaction condition if the frequency of the user smoking in the predetermined period of time is larger than the preset value.

Optionally, pushing a group message to the user terminals of the user includes:

pushing, by the service platform, promotion information or game data to the user terminal.

Optionally, the user terminal is a mobile phone, a personal computer, a laptop or a tablet computer.

A communication system according to an embodiment of the present disclosure, includes:

an electronic cigarette, a user terminal and a service platform;

wherein the electronic cigarette is configured to detect a behavior characteristic of a user, generate a triggering signal if the behavior characteristic of the user satisfies a preset condition, and transmit the triggering signal to the user terminal bound to the electronic cigarette;

the user terminal is configured to perform positioning and transmit position information of the user terminal to the service platform; and the service platform is configured to judge whether the user satisfies an interaction condition according to the received position information; and push a group message to the user terminal if the user satisfies the interaction condition.

Optionally, the electronic cigarette includes a sensor and a processor;

where the sensor is configured to generate a pulse signal and transmit the pulse signal to the processor when the user is smoking; and the processor is configured to generate the triggering signal according to the pulse signal, for indicating that the user is smoking.

Optionally, the sensor is an airflow sensitive switch or a key switch; and the key switch is a light-touch switch or a sensitive switch.

Optionally, the electronic cigarette may be further configured to collect a smoking parameter of the user and transmit the smoking parameter to the user terminal if the behavior characteristic of the user satisfies the preset condition.

Optionally, the user terminal is further configured to judge whether a difference between a time when the user last smokes and a current time is smaller than a preset value according to the smoking parameter, and trigger the user terminal to perform the positioning if the difference between the time when the user last smokes and the current time is smaller than the preset value; or the user terminal is further configured to judge whether a frequency of the user smoking in a predetermined period of time is larger than a preset value according to the smoking parameter, and trigger the user terminal to perform the positioning if the frequency of the user smoking in the predetermined period of time is larger than the preset value.

Optionally, the user terminal is further configured to transmit the smoking parameter to the service platform; and the service platform is configured to judge whether the user satisfies the interaction condition according to the smoking parameter and the received position information.

Optionally, the user terminal is a mobile phone, a personal computer, a laptop or a tablet computer.

It can be seen from the above technical solutions that the embodiments of the present disclosure have the following advantages.

In the embodiments of the present disclosure, the electronic cigarette is configured to detect the behavior characteristic of the user, and generate the triggering signal and transmit the triggering signal to the user terminal bound to the electronic cigarette when the behavior characteristic of the user satisfies the preset condition. The user terminal is configured to perform positioning and transmit the position information of the user terminal to the service platform. The service platform is configured to judge whether the user satisfies an interaction condition according to the received position information; and push the group message to the user terminal if the user satisfies the interaction condition. That is, the service platform may transmit the group message to the plurality of users who meet the interaction condition to facilitate the interaction between the users.

BRIEF DESCRIPTION OF THE DRAWINGS

In order to illustrate the technical solutions according to the embodiments of the present disclosure or in the prior art more clearly, drawings to be used in the description of the prior art or the embodiments will be described briefly hereinafter. Apparently, the drawings described hereinafter are only a few of embodiments of the present disclosure, and other drawings may be obtained by those skilled in the art according to those drawings without creative labor.

DETAILED DESCRIPTION OF THE EMBODIMENTS

The technical solutions in the embodiments of the present disclosure will be described clearly and completely hereinafter in conjunction with the drawings in the embodiments of the present disclosure. Apparently, the described embodiments are only a part but not all of the embodiments of the present disclosure. All the other embodiments can be obtained by those skilled in the art without creative effort on the basis of the embodiments of the present disclosure, which fall within the scope of protection of the present disclosure.

Figure 1:
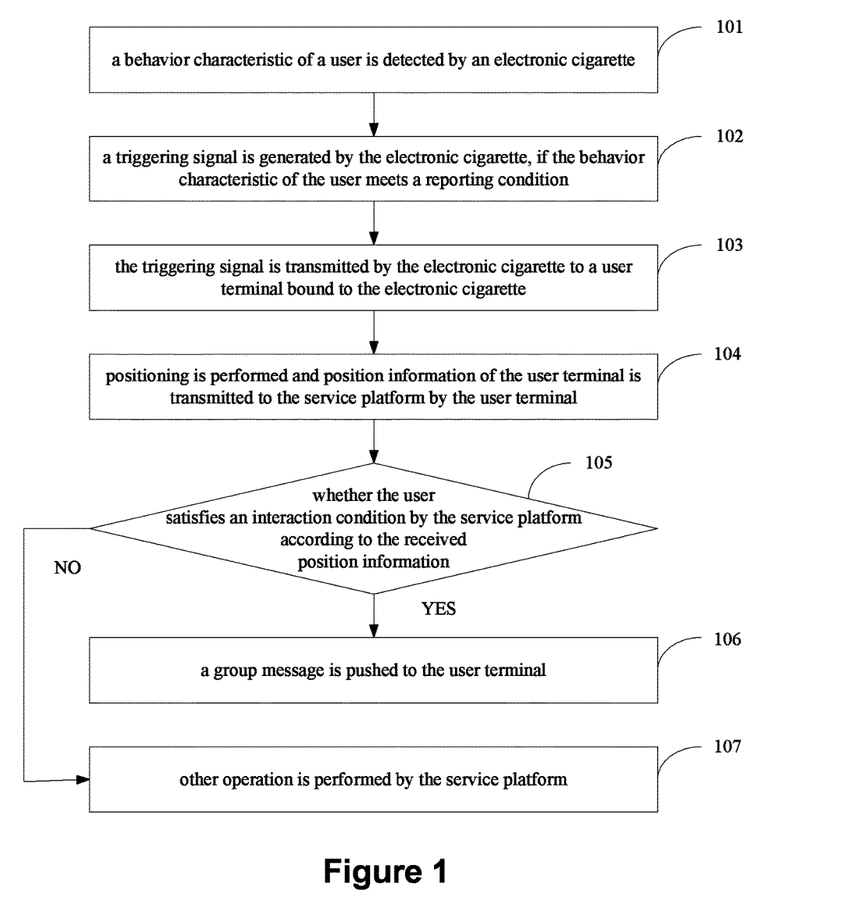
FIG. 1 is a schematic diagram of an information pushing method according to an embodiment of the present disclosure.

Referring to FIG. 1, an information pushing method according to an embodiment of the present disclosure includes the following steps 101 to 107.

In step 101, a behavior characteristic of a user is detected by an electronic cigarette.

In this embodiment, the behavior characteristic of the user may be detected by the electronic cigarette, so as to analyze a current behavior of the user. For example, the user is smoking, the user is going to smoke, or the user turns off the electronic cigarette, which is not limited in detail here.

In step 102, a triggering signal is generated by the electronic cigarette, if the behavior characteristic of the user meets a reporting condition.

A triggering signal may be generated by the electronic cigarette if the behavior characteristic of the user meets a reporting condition. The triggering is used to indicate a current behavior of the user, for example, the user is smoking, the user is going to smoke, or the user turns off the electronic cigarette, which is not limited in detail here.

In step 103, the triggering signal is transmitted by the electronic cigarette to a user terminal bound to the electronic cigarette.

After being generated, the triggering signal may be transmitted to a user terminal previously bound to the electronic cigarette by the electronic cigarette.

In step 104, positioning is performed and position information of the user terminal is transmitted to the service platform by the user terminal.

The user terminal may perform positioning and transmit the position information of the user terminal to the service platform when receiving the triggering signal transmitted by the electronic cigarette.

In step 105, it is judged whether the user satisfies an interaction condition by the service platform according to the received position information; if the user satisfies the interaction condition, step 106 is performed; if the user does not satisfy the interaction condition, step 107 is performed.

In this embodiment, after receiving the position information transmitted by the user terminal, the service platform may judge whether the user corresponding to the user terminal satisfies the interaction condition according to the position information transmitted by the user terminal.

In step 106, a group message is pushed to the user terminal.

The group message may be pushed to the user terminal of the user if the service platform determines the user corresponding to the user terminal satisfies the interaction condition according to the position information transmitted by the user terminal.

In step 107, other operation is performed by the service platform.

Other operation may be performed if the service platform determines the user does not satisfy the interaction condition according to the position information transmitted by the user terminal. For example, different messages may be transmitted to user terminals of users respectively, or no message is transmitted, which is not limited in detail here.

In the embodiments of the present disclosure, the electronic cigarette is configured to detect the behavior characteristic of the user, and generate the triggering signal and transmit the triggering signal to the user terminal bound to the electronic cigarette if the behavior characteristic of the user satisfies the preset condition. The user terminal is configured to perform positioning and transmit the position information of the user terminal to the service platform. The service platform is configured to judge whether the user satisfies an interaction condition according to the received position information; and push a group message to the user terminal of the user if the user satisfies the interaction condition. That is, the service platform may transmit the group message to a plurality of users who satisfy the interaction condition according to position information of the user terminals to facilitate interaction between the users.

Figure 2:
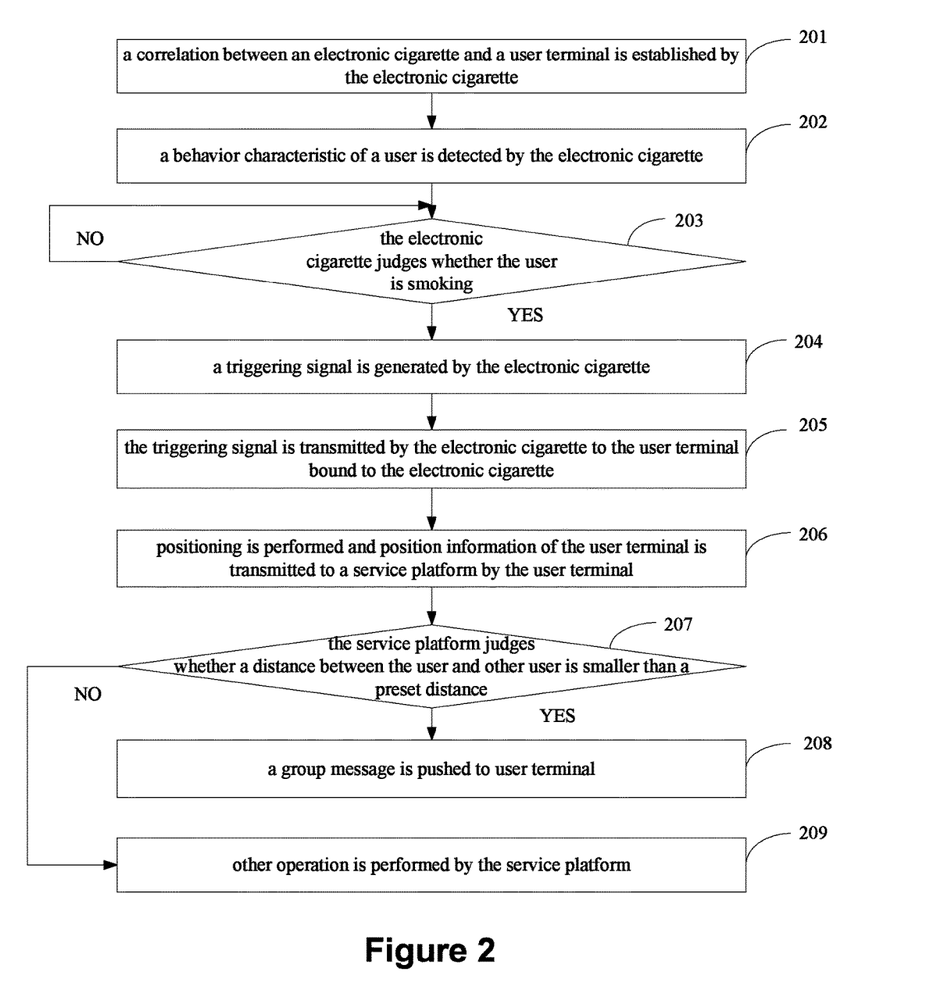
FIG. 2 is a schematic diagram of an information pushing method according to another embodiment of the present disclosure.

An information pushing method according to the embodiment of the present disclosure is described in detail in the following. Referring to FIG. 2, an information pushing method according to another embodiment of the present disclosure includes the following steps 201 to 208.

In step 201, a correlation between an electronic cigarette and a user terminal is established by the electronic cigarette.

In this embodiment, a user may bind his/her electronic cigarette to his/her user terminal. Particularly, a correlation between the electronic cigarette and the user terminal may be established by the electronic cigarette through Bluetooth, WIFI, infrared or NFC.

The user terminal in this embodiment may be a mobile phone, a personal computer, a laptop, a tablet computer, or other types of terminal, which is not limited in detail here.

In step 202, a behavior characteristic of a user is detected by the electronic cigarette.

In this embodiment, the behavior characteristic of the user may be detected by the electronic cigarette, so as to analyze a current behavior of the user, for example, the user is smoking, the user is going to smoke, or the user turns off the electronic cigarette, which is not limited in detail here.

In step 203, the electronic cigarette judges whether the user is smoking; if the user is smoking, step 204 is performed; or else, step 203 is performed again.

In this embodiment, after detecting the behavior characteristic of the user, the electronic cigarette may judge whether the user is smoking; if the user is smoking, step 204 is performed; or else, the determination is repeated.

It should be noted that whether the user is smoking may be judged by the electronic cigarette in many manners. For example, the determination may be made according to the operating condition of an atomizer assembly in the electronic cigarette. When the atomizer assembly is operating, it may be determined that the user is smoking.

Alternatively, the determination may be made according to the operating condition of a sensor in the electronic cigarette. When the sensor is operating, it may be determined that the user is smoking.

Alternatively, the determination may be made according to the consumption rate of a battery in the electronic cigarette. When the battery consumption rate is larger than a threshold, it may be determined that the user is smoking.

The sensor in this embodiment may be an airflow sensitive switch, a key switch, or other types of switch, which is not limited in detail here. The key switch may be a light-touch switch, a sensitive switch or other types of switch, which is not limited in detail here either.

It should be understood that whether the user is smoking may be judged by the electronic cigarette in many other manners in practice, which is not limited in detail here.

In step 204, a triggering signal is generated by the electronic cigarette.

If the electronic cigarette detects that the user is smoking, it may be determined that the behavior characteristic of the user satisfies a reporting condition, and the triggering signal may be generated by the electronic cigarette for indicating that the user is smoking.

Particularly, a pulse signal is generated and is transmitted to a processor in the electronic cigarette by a sensor in the electronic cigarette; and the triggering signal is generated by the processor in the electronic cigarette according to the pulse signal, for indicating that the user is smoking.

In step 205, the triggering signal is transmitted by the electronic cigarette to the user terminal bound to the electronic cigarette.

After being generated, the triggering signal may be transmitted by the electronic cigarette to a user terminal previously bound to the electronic cigarette.

It should be noted that the electronic cigarette may further detect a client application in the user terminal bound to the electronic after generating the triggering signal in practice.

If the electronic cigarette determines that the client application in the user terminal does not operate, it indicates that the user closes the client application, the user terminal is not started up, or the user terminal is located in an area without network signal coverage. The data communication between the electronic cigarette and the user terminal can not be achieved. The electronic cigarette may stop operating and end the current process.

If the electronic cigarette determines that the client application in the user terminal operates, it indicates that the electronic cigarette is enabled to perform data communication with the user terminal, and the triggering signal may be transmitted to the user terminal by the electronic cigarette.

In this embodiment, the electronic cigarette may transmit a client detecting massage to the user terminal, then judge whether a client response message replied by the user terminal is received. The electronic cigarette determines that the client application in the user terminal operates if the client response message replied by the user terminal is received, or determines that the client application in the user terminal does not operate if the client response message replied by the user terminal is not received.

Whether the client application in the user terminal operates may be judged by the electronic cigarette in many other manners in practice, which is not limited in detail here.

In step 206, positioning is performed and position information of the user terminal is transmitted to a service platform by the user terminal.

After receiving the triggering signal transmitted by the electronic cigarette, the user terminal may perform positioning and transmit the position information to the service platform.

In this embodiment, the user terminal may start up a positioning function to obtain the latitude and longitude of the user terminal, or start up a map service API (for example, Google Maps or Apple Maps) to obtain the latitude and longitude of the user terminal. When starting up to the map service API to obtain the latitude and longitude of the user terminal, the following steps (1) to (3) may be performed.

In step (1), the map service API in the user terminal is started up.

In step (2), data returned by the map service API is obtained.

In step (3), whether the data is successfully obtained is judged; if the data is successfully obtained, the obtained latitude and longitude is stored and taken as present position information; if the data is not successfully obtained, last stored data is taken as the a present position information.

In step 207, the service platform judges whether a distance between the user and other user is smaller than a preset distance according to the received position information of the user terminal; if the distance between the user and other user is smaller than the preset distance, step 208 is performed; if the distance between the user and other user is not smaller than the preset distance, step 209 is performed.

In this embodiment, after receiving the position information transmitted by the user terminal and other user terminal, the service platform may judge whether the distance between the users corresponding to the user terminals is smaller than a preset distance according to the position information transmitted by the user terminals.

In step 208, a group message is pushed to user terminal.

The group message may be pushed to the user terminals of the users if the service platform determines the distance between the users corresponding to the user terminals is smaller than a preset distance according to the position information transmitted by the user terminals.

The group message in this embodiment may be same or corresponding promotion information or game data, which is not limited in detail here.

In this embodiment, if an APP program corresponding to the electronic cigarette is installed on the user terminal, the group message may be pushed to the APP program by the service platform and the group message is presented to the user by the APP program; and if there is no APP program corresponding to the electronic cigarette on the user terminal, the group message may be pushed to other programs (for example, a browser) originally installed on the user terminal and the group message may be presented by these programs, which is not limited in detail here.

It should be noted that the process of the service platform pushing the group message to the user terminal in this embodiment is described in the following steps (1) to (3).

In step (1), the distances between individuals in a group and the number of individuals in the group is calculated by the service platform.

Particularly, the service platform may calculate the distance between the user terminals whose position information is received during a certain period of time according to the position information, set a center, and determine that the user, the distance from whom to the center is less than a preset distance, meet a distance condition, then determine the number of those user.

In step (2), a massage is pushed by the service platform.

Particularly, the service platform may push a specific massage to the user terminal in a specific position according to the position of the user.

In step (3), the massage is received by the user terminal.

Particularly, the user terminal detects the pushing by the service platform and obtains the pushed information.

In step 209, other operation is performed by the service platform.

Other operation may be performed if the service platform determines the distances between the center and the user terminals are larger than or equal to a preset distance according to the position information transmitted by the user terminals. For example, different message may be transmitted to the user terminals, or no message is transmitted, which is not limited in detail here.

In the embodiments of the present disclosure, the electronic cigarette is configured to detect the behavior characteristic of the user, and generate the triggering signal and transmit the triggering signal to the user terminal bound to the electronic cigarette if the behavior characteristic of the user satisfies the preset condition. The user terminal is configured to perform positioning and transmit the position information of the user terminal to the service platform. The service platform is configured to judge whether the user satisfies an interaction condition according to the received position information; and push a group message to the user terminal of the user if the user satisfies the interaction condition. That is, the service platform may transmit the group message to a plurality of users who satisfy the interaction condition according to the position information of the user terminals to facilitate interaction between the users.

Further, in this embodiment, before transmitting the triggering signal, the electronic cigarette may detect the client application in the user terminal, and transmit the triggering signal only when the client application in the user terminal operates, thereby the effectiveness of transmitting data may be ensured and the power consumption may be reduced.

In the above embodiments, the electronic cigarette may transmit the triggering signal to the user terminal on detecting that the user is smoking. The user terminal may perform positioning and transmit the position information of the user terminal to the service platform. The service platform may judge whether the user satisfies the interaction condition according to the position information. In practice, the electronic cigarette may collect more kinds of data, and the user terminal and the service platform may operate according to more kinds of data. For example, the electronic cigarette may also collect smoking data. The process is described in detail in the following.

Figure 3:
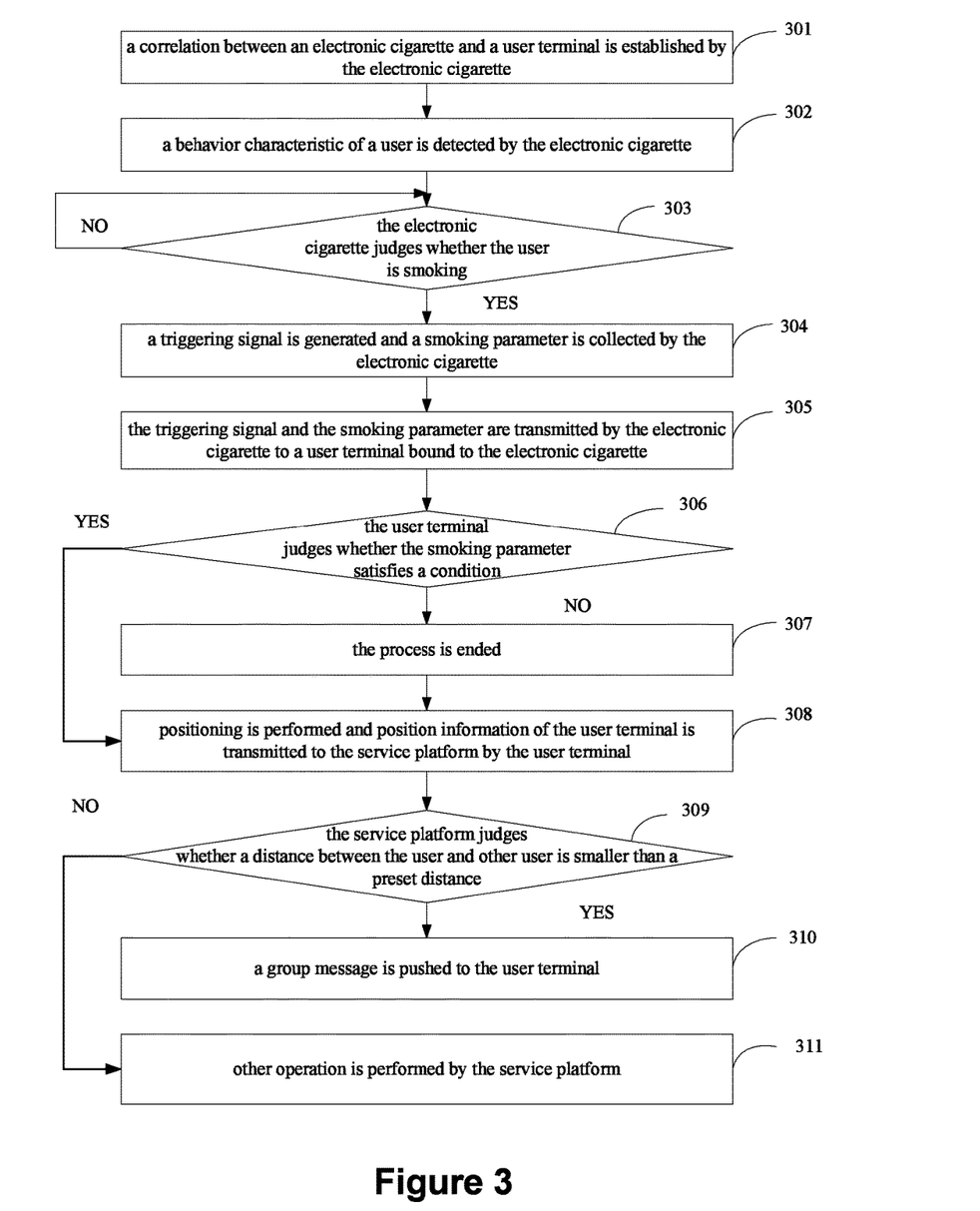
FIG. 3 is a schematic diagram of an information pushing method according to yet another embodiment of the present disclosure.

A first embodiment, where the smoking parameter is verified by the user terminal.

Referring to FIG. 3, an information pushing method according to yet another embodiment of the present disclosure includes the following steps 301 to 311.

In step 301, a correlation between an electronic cigarette and a user terminal is established by the electronic cigarette.

In this embodiment, a user may bind his/her electronic cigarette to his/her user terminal. Particularly, a correlation between the electronic cigarette and the user terminal may be established by the electronic cigarette through Bluetooth, WIFI, infrared or NFC.

The user terminal in this embodiment may be a mobile phone, a personal computer, a laptop, a tablet computer, or other types of terminal, which is not limited in detail here.

In step 302, a behavior characteristic of a user is detected by the electronic cigarette.

In this embodiment, the behavior characteristic of the user may be detected by the electronic cigarette, so as to analyze a current behavior of the user, for example, the user is smoking, the user is going to smoke, or the user turns off the electronic cigarette, which is not limited in detail here.

In step 303, the electronic cigarette judges whether the user is smoking; if the user is smoking, step 304 is performed; or else, step 303 is performed again.

In this embodiment, after detecting the behavior characteristic of the user, the electronic cigarette may judge whether the user is smoking; if the user is smoking, step 304 is performed; or else, the determination is repeated.

It should be noted that whether the user is smoking may be judged by the electronic cigarette in many manners. For example, the determination may be made according to the operating condition of an atomizer assembly in the electronic cigarette. When the atomizer assembly is operating, it may be determined that the user is smoking.

Alternatively, the determination may be made according to the operating condition of a sensor in the electronic cigarette. When the sensor is operating, it may be determined that the user is smoking.

Alternatively, the determination may be made according to the consumption rate of a battery in the electronic cigarette. When the battery consumption rate is larger than a threshold, it may be determined that the user is smoking.

The sensor in this embodiment may be an airflow sensitive switch or a key switch, or other types of switch, which is not limited in detail here. The key switch may be a light-touch switch, a sensitive switch or other types of switch, which is not limited in detail here either.

It should be understood that whether the user is smoking may be judged by the electronic cigarette in many other manners in practice, which is not limited in detail here.

In step 304, a triggering signal is generated and a smoking parameter is collected by the electronic cigarette.

If the electronic cigarette determines that the user is smoking, it is determined that the behavior characteristic of the user satisfies a reporting condition, and the triggering signal may be generated by the electronic cigarette for indicating that the user is smoking.

Particularly, a pulse signal is generated and is transmitted to a processor in the electronic cigarette by a sensor in the electronic cigarette; and the triggering signal is generated by the processor in the electronic cigarette according to the pulse signal, for indicating that the user is smoking.

In this embodiment, the electronic cigarette may further collect the smoking parameter, such as the last time to smoke, a smoking frequency in recent period of time, through a sensor provided on the electronic cigarette. It should be understood that the smoking parameter may include more contents in practice, which is not limited in detail here.

In step 305, the triggering signal and the smoking parameter are transmitted by the electronic cigarette to a user terminal bound to the electronic cigarette.

After being generated, the triggering signal may be transmitted by the electronic cigarette to a user terminal previously bound to the electronic cigarette.

Further, after being collected, the smoking parameter may also be transmitted by the electronic cigarette to the user terminal previously bound to the electronic cigarette.

It should be noted that the electronic cigarette may further detect a client application in the user terminal bound to the electronic after generating the triggering signal and collecting the smoking parameter in practice.

If the electronic cigarette determines that the client application in the user terminal does not operate, it indicates that the user closes the client application, the user terminal is not started up, or the user terminal is located in an area without network signal coverage. The data communication between the electronic cigarette and the user terminal can not be achieved. The electronic cigarette may stop operating and end the current process.

If the electronic cigarette determines that the client application in the user terminal operates, it indicates that the electronic cigarette is enabled to perform data communication with the user terminal, and the triggering signal and the smoking parameter may be transmitted to the user terminal by the electronic cigarette.

In this embodiment, the electronic cigarette may transmit a client detecting massage to the user client, then judge whether a client response message replied by the user terminal is received. And the electronic cigarette determines that the client application in the user terminal operates if the client response message replied by the user terminal is received, or determines that the client application in the user terminal does not operate if the client response message replied by the user terminal is not received.

Whether the client application in the user terminal operates may be judged by the electronic cigarette in many other manners in practice, which is not limited in detail here.

In step 306, the user terminal judges whether the smoking parameter satisfies a condition; if the smoking parameter satisfies the condition, step 308 is performed; if the smoking parameter does not satisfies the condition, step 307 is performed.

In this embodiment, after receiving the smoking parameter transmitted by the electronic cigarette, the user terminal may judge whether the smoking parameter satisfies a condition, which may particularly includes:

the user terminal judging whether a difference between the time when the user last smokes and the current time is smaller than a preset value according to the smoking parameter, and determining the condition is satisfied if the difference between the time when the user last smokes and the current time is smaller than the preset value; or the user terminal judging whether a frequency of the user smoking in a predetermined period of time is larger than a preset value according to the smoking parameter, and determining the condition is satisfied if the frequency of the user smoking in a predetermined period of time is larger than a preset value.

It should be understood that whether the smoking parameter satisfies the condition may be judged by the user terminal in many other manners in practice, which is not limited in detail here.

In step 307, the process is ended.

It indicates that the user does not smoke frequently or has not been smoked for a long time if the user terminal determines the smoking parameter does not satisfy the condition, and the user terminal may end the process.

In step 308, positioning is performed and position information of the user terminal is transmitted to the service platform by the user terminal.

It indicates that the user smokes frequently or is smoking recently if the user terminal determines the smoking parameter satisfies the condition. The user terminal may perform positioning and transmit the position information to the service platform In this embodiment, the user terminal may start up a positioning function to obtain the latitude and longitude of the user terminal, or start up a map service API (for example, Google Maps or Apple Maps) to obtain the latitude and longitude of the user terminal. When starting up to the map service API to obtain the latitude and longitude of the user terminal, the following steps (1) to (3) may be performed.

In step (1), the map service API in the user terminal is started up.

In step (2), data returned by the map service API is obtained.

In step (3), whether the data is successfully obtained is judged; if the data is successfully obtained, the obtained latitude and longitude is stored and taken as present position information; if the data is not successfully obtained, last stored data is taken as the a present position information.

In step 309, the service platform judges whether a distance between the user and other user is smaller than a preset distance according to the received position information of the user terminal; if the distance between the user is smaller than the preset distance, step 310 is performed; if the distance between the user and other user is not smaller than the preset distance, step 311 is performed.

In this embodiment, after receiving the position information transmitted by the user terminal and other user terminal, the service platform may judge whether the distance between the users corresponding to the user terminals is smaller than a preset distance according to the position information transmitted by the user terminals.

In step 310, a group message is pushed to the user terminal.

The group message may be pushed to the user terminals of the users if the service platform determines the distance between the users corresponding to the user terminals is smaller than a preset distance according to the position information transmitted by the user terminals.

The group message in this embodiment may be same or corresponding promotion information or game data, which is not limited in detail here.

It should be noted that, in this embodiment, if an APP program corresponding to the electronic cigarette is installed on the user terminal, the group message may be pushed to the APP program by the service platform and the group message is presented to the user by the APP program; and if there is no APP program corresponding to the electronic cigarette on the user terminal, the group message may be pushed to other programs (for example, a browser) originally installed on the user terminal and the group message may be presented by these programs, which is not limited in detail here.

It should be noted that the process of the service platform pushing the group message to the user terminal in this embodiment is described in the following steps (1) to (3).

In step (1), the distances between individuals in a group and the number of individuals in the group is calculated by the service platform.

Particularly, the service platform may calculate the distance between the user terminals whose position information is received during a certain period of time according to the position information, set a center, and determine that the user, the distance from whom to the center is less than a preset distance, meet a distance condition, then determine the number of those user.

In step (2), a massage is pushed by the service platform.

Particularly, the service platform may push a specific massage to the user terminal in a specific position according to the position of the user.

In step (3), the massage is received by the user terminal.

Particularly, the user terminal detects the pushing by the service platform and obtains the pushed information.

In step 311, other operation is performed by the service platform.

Other operation may be performed if the service platform determines the distances between the center and the user terminals are larger than or equal to a preset distance according to the position information transmitted by the user terminals. For example, different message may be transmitted to the user terminals, or no message is transmitted, which is not limited in detail here.

In this embodiment, the electronic cigarette is configured to detect the behavior characteristic of the user, and generate the triggering signal and transmit the triggering signal to the user terminal bound to the electronic cigarette if the behavior characteristic of the user satisfies the preset condition. The user terminal is configured to perform positioning and transmit the position information of the user terminal to the service platform. The service platform is configured to judge whether the user satisfies an interaction condition according to the received position information; and push a group message to the user terminal of the user if the user satisfies the interaction condition. That is, the service platform may transmit the group message to a plurality of users who satisfy the interaction condition according to the position information of the user terminals to facilitate interaction between the users.

Furthermore, in this embodiment, before transmitting the triggering signal, the electronic cigarette may detect the client application in the user terminal, and transmit the triggering signal only when the client application in the user terminal operates, thereby the effectiveness of transmitting data may be ensured and the power consumption may be reduced.

Furthermore, on reception of the smoking parameter from the electronic cigarette, the user terminal may judge whether the smoking parameter satisfies the condition, and end the process if the smoking parameter does not satisfy the condition, thereby the burden on the service platform is reduced.

Figure 4:
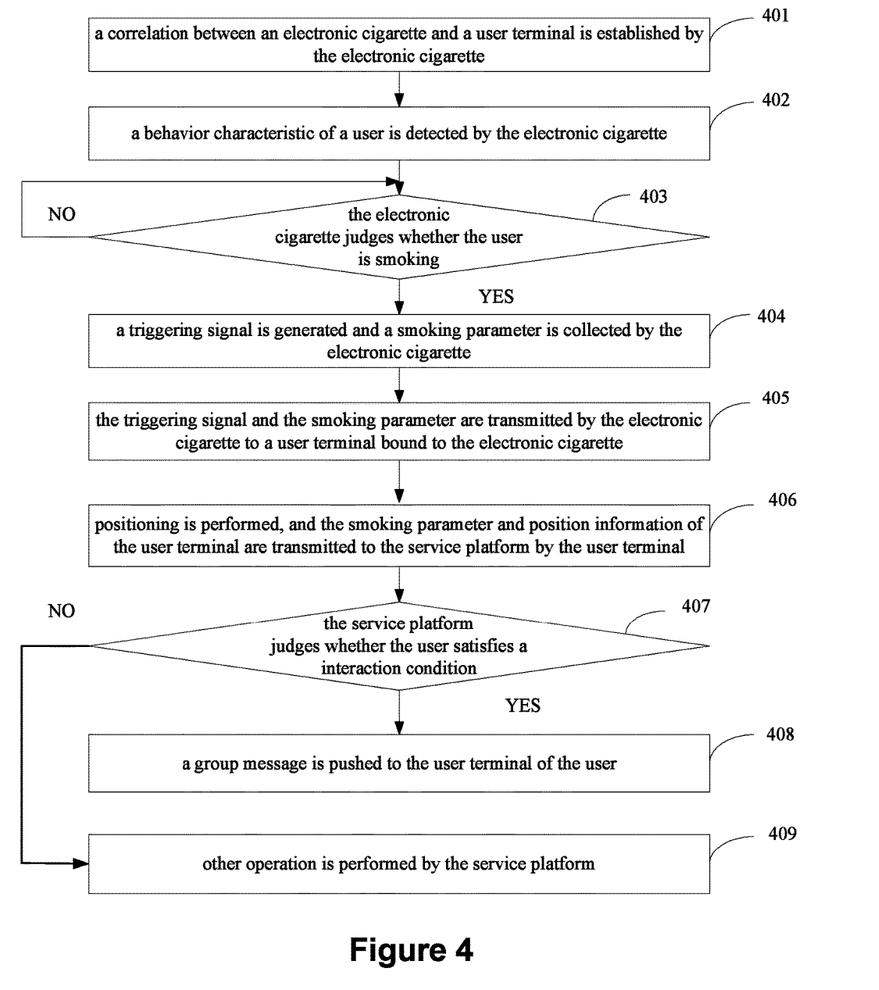
FIG. 4 is a schematic diagram of an information pushing method according to still another embodiment of the present disclosure.

A second embodiment, where the smoking parameter is verified by the user terminal.

Referring to FIG. 4, an information pushing method according to yet another embodiment of the present disclosure includes the following steps 401 to 409.

In step 401, a correlation between an electronic cigarette and a user terminal is established by the electronic cigarette.

In this embodiment, a user may bind his/her electronic cigarette to his/her user terminal. Particularly, a correlation between the electronic cigarette and the user terminal may be established by the electronic cigarette through Bluetooth, WIFI, infrared or NFC.

The user terminal in this embodiment may be a mobile phone, a personal computer, a laptop, a tablet computer, or other types of terminal, which is not limited in detail here.

In step 402, a behavior characteristic of a user is detected by the electronic cigarette.

In this embodiment, the behavior characteristic of the user may be detected by the electronic cigarette, so as to analyze a current behavior of the user, for example, the user is smoking, the user is going to smoke, or the user turns off the electronic cigarette, which is not limited in detail here.

In step 403, the electronic cigarette judges whether the user is smoking; if the user is smoking, step 404 is performed; or else, step 403 is performed again.

In this embodiment, after detecting the behavior characteristic of the user, the electronic cigarette may judge whether the user is smoking; if the user is smoking, step 404 is performed; or else, the determination is repeated.

It should be noted that whether the user is smoking may be judged by the electronic cigarette in many manners. For example, the determination may be made according to the operating condition of an atomizer assembly in the electronic cigarette. When the atomizer assembly is operating, it may be determined that the user is smoking.

Alternatively, the determination may be made according to the operating condition of a sensor in the electronic cigarette. When the sensor is operating, it may be determined that the user is smoking.

Alternatively, the determination may be made according to the consumption rate of a battery in the electronic cigarette. When the battery consumption rate is larger than a threshold, it may be determined that the user is smoking.

The sensor in this embodiment may be an airflow sensitive switch or a key switch, or other types of switch, which is not limited in detail here. The key switch may be a light-touch switch, a sensitive switch or other types of switch, which is not limited in detail here either.

It should be understood that whether the user is smoking may be judged by the electronic cigarette in many other manners in practice, which is not limited in detail here.

In step 404, a triggering signal is generated and a smoking parameter is collected by the electronic cigarette.

If the electronic cigarette detects that the user is smoking, it is determined that the behavior characteristic of the user satisfies a reporting condition, and the triggering signal may be generated by the electronic cigarette for indicating that the user is smoking.

Particularly, a pulse signal is generated and is transmitted to a processor in the electronic cigarette by the sensor in the electronic cigarette; and the triggering signal is generated by the processor in the electronic cigarette according to the pulse signal, for indicating that the user is smoking the electronic cigarette.

In this embodiment, the electronic cigarette may further collect the smoking parameter, such as the last time to smoke, a smoking frequency in recent period of time, through a sensor provided on the electronic cigarette. It should be understood that the smoking parameter may include more contents in practice, which is not limited in detail here.

In step 405, the triggering signal and the smoking parameter are transmitted by the electronic cigarette to the user terminal bound to the electronic cigarette.

After being generated, the triggering signal may be transmitted by the electronic cigarette to a user terminal previously bound to the electronic cigarette.

Further, after being collected, the smoking parameter may also be transmitted by the electronic cigarette to the user terminal previously bound to the electronic cigarette.

It should be noted that the electronic cigarette may further detect a client application in the user terminal bound to the electronic after generating the triggering signal and collecting the smoking parameter in practice.

If the electronic cigarette determines that the client application in the user terminal operates, it indicates that the user closes the client, the user terminal is not started up, or the user terminal is located in an area without network signal coverage. The data communication between the electronic cigarette and the user terminal can not be achieved. The electronic cigarette may stop operating and end the current process.

If the electronic cigarette determines that the client in the user terminal operates, it indicates that the electronic cigarette is enabled to perform data communication with the user terminal, and the triggering signal and the smoking parameter may be transmitted to the user terminal by the electronic cigarette.

In this embodiment, the electronic cigarette may transmit a client detecting massage to the user client, then judge whether a client response message replied by the user terminal is received. The electronic cigarette determines that the client application in the user terminal operates if the client response message replied by the user terminal is received, or determines that the client application in the user terminal does not operate if the client response message replied by the user terminal is not received.

Whether the client application in the user terminal operates may be judged by the electronic cigarette in many other manners in practice, which is not limited in detail here.

In step 406, positioning is performed, and the smoking parameter and position information of the user terminal are transmitted to the service platform by the user terminal.

After receiving the smoking parameter, the user terminal may perform positioning, and transmit the smoking parameter and the position information of the user terminal to the user platform.

In this embodiment, the user terminal may start up a positioning function to obtain the latitude and longitude of the user terminal, or start up a map service API (for example, Google Maps or Apple Maps) to obtain the latitude and longitude of the user terminal. When starting up to the map service API to obtain the latitude and longitude of the user terminal, the following steps (1) to (3) may be performed.

In step (1), the map service API in the user terminal is started up.

In step (2), data returned by the map service API is obtained.

In step (3), whether the data is successfully obtained is judged; if the data is successfully obtained, the obtained latitude and longitude is stored and taken as present position information; if the data is not successfully obtained, last stored data is taken as the a present position information.

In step 407, the service platform judges whether the user satisfies a interaction condition according to the smoking parameter and the position information; if the user satisfies the interaction condition, step 408 is performed; if the user does not satisfies the interaction condition, step 409 is performed.

In this embodiment, after obtaining the smoking parameter and the position information, the service platform may judge whether the user satisfies a interaction condition according to the smoking parameter and the position information, which may particularly includes:

the service platform judging whether a distance between the user and other user is smaller than a preset distance according to the position terminal, judging whether the difference between the time when the user last smokes the electronic cigarette and the current time is smaller than the preset value according to the smoking parameter if the distance between the user and other user is smaller than the preset distance according to the position information, and determining that the interaction condition is satisfied if the difference between the time when the user last smokes the electronic cigarette and the current time is smaller than the preset value; or the service platform judging whether the distance between the plurality of users is smaller than a preset distance according to the positioning result, judging whether the frequency of the user smoking in the predetermined period of time is larger than the preset value according to the smoking parameter if the distance between the plurality of users is smaller than the preset distance according to the position information, and determining that the interaction condition is satisfied if the frequency of the user smoking in the predetermined period of time is larger than the preset value.

It should be understood that whether the interaction condition is satisfied may be judged by the service platform in many other manners in practice, which is not limited in detail here.

In step 408, a group message is pushed to the user terminal of the user.

The group message may be pushed to the user terminal of the user if the service platform determines the user satisfies the interaction condition according to the position information transmitted by the user terminal and the smoking parameter.

The group message in this embodiment may be same or corresponding promotion information or game data, which is not limited in detail here.

It should be noted that, in this embodiment, if an APP program corresponding to the electronic cigarette is installed on the user terminal, the group message may be pushed to the APP program by the service platform and the group message is presented to the user by the APP program; and if there is no APP program on the user terminal, the group message may be pushed to other programs (for example, a browser) originally installed on the user terminal and the group message may be presented by these programs, which is not limited in detail here.

It should be noted that the process of the service platform pushing the group message to the user terminal in this embodiment is described in the following steps (1) to (3).

In step (1), the distances between individuals in a group and the number of individuals in the group is calculated by the service platform.

Particularly, the service platform may calculate the distance between the user terminals whose position information is received during a certain period of time according to the position information, set a center, and determine that the user, the distance from whom to the center is less than a preset distance, meet a distance condition, then determine the number of those user.

In step (2), a massage is pushed by the service platform.

Particularly, the service platform may push a specific massage to the user terminal in a specific position according to the position of the user.

In step (3), the massage is received by the user terminal.

Particularly, the user terminal detects the pushing by the service platform and obtains the pushed information.

In step 409, other operation is performed by the service platform.

Other operation may be performed if the service platform determines the user does not satisfies the interaction condition corresponding to the user terminal is larger than or equal to a preset distance according to the position information transmitted by the user terminal and the smoking parameter. For example, no message is transmitted, which is not limited in detail here.

In this embodiment, the electronic cigarette is configured to detect the behavior characteristic of the user, and generate the triggering signal and transmit the triggering signal to the user terminal bound to the electronic cigarette if the behavior characteristic of the user satisfies the preset condition. The user terminal is configured to perform positioning and transmit the position information of the user terminal to the service platform. The service platform is configured to judge whether the user satisfies an interaction condition according to the received position information; and push the group message to the user terminal of the user if the user satisfies the interaction condition. That is, the service platform may transmit the group message to the user who satisfies the interaction condition according to the position information of the user terminal to facilitate the interaction between multiple users.

Furthermore, in this embodiment, before transmitting the triggering signal, the electronic cigarette may detect the client application in the user terminal, and transmit the triggering signal only when the client application in the user terminal operates, thereby the effectiveness of transmitting data may be ensured and the power consumption may be reduced.

Furthermore, in this embodiment, the service platform may synthetically judge whether the interaction condition is satisfies according to the smoking parameter and the position information, thereby the user may be selected more accurately and the accuracy of information pushing is enhanced.

Figure 5:
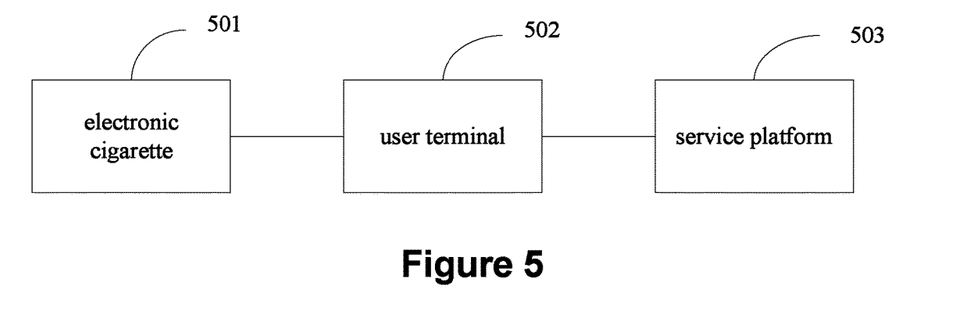
FIG. 5 is a schematic diagram of a communication system according to an embodiment of the present disclosure.

The information pushing method according to the embodiment of the present disclosure is described above. A communication system according to the embodiment of the present disclosure is described in detail in the following. Referring to FIG. 5, a communication system according to an embodiment of the present disclosure includes: an electronic cigarette 501, a user terminal 502 and a service platform 503.

The electronic cigarette 501 is configured to detect a behavior characteristic of a user, generate a triggering signal if the behavior characteristic of the user satisfies a preset condition, and transmit the triggering signal to the user terminal 502 bound to the electronic cigarette.

The user terminal 502 is configured to perform positioning and transmit position information of the user terminal to the service platform 503.

The service platform 503 is configured to judge whether the user satisfies an interaction condition according to the received position information; and push a group message to the user terminals 502 of the user if the user satisfies the interaction condition.

In this embodiment, the electronic cigarette 501 includes at least a sensor and a processor.

The sensor is configured to generate a pulse signal and transmit the pulse signal to the processor in the electronic cigarette 501 when the user is smoking.

The processor in the electronic cigarette 501 is configured to generate a triggering signal according to the pulse signal, for indicating that the user is smoking.

In this embodiment, the sensor may be an airflow sensitive switch, or a key switch.

The key switch may be a light-touch switch or a sensitive switch.

In this embodiment, the electronic cigarette may be further configured to collect a smoking parameter of a user and transmit the smoking parameter to the user terminal 502 if the behavior characteristic of the user satisfies the preset condition.

In this embodiment, the user terminal 502 may be further configured to judge whether a difference between the time when the user last smokes the electronic cigarette and the current time is smaller than a preset value according to the smoking parameter, and trigger the function of positioning by the user terminal if the difference between the time if the user last smokes the electronic cigarette and the current time is smaller than the preset value;

alternatively, the user terminal 502 may be further configured to judge whether a frequency of the user smoking in a predetermined period of time is larger than a preset value according to the smoking parameter, and trigger the function of positioning by the user terminal if the frequency of the user smoking in a predetermined period of time is larger than a preset value.

In this embodiment, the user terminal 502 may be further configured to transmit the smoking parameter to the service platform 503; and the service platform 503 may be configured to judge whether the user satisfies the interaction condition according to the smoking parameter and the received position information.

The user terminal 502 in this embodiment may be a mobile phone, a personal computer, a laptop, or a tablet compute.

In order to be understood easily, the communication system according to the embodiments of the present disclosure is described in a particular scene in the following.

In this embodiment, a user may bind his/her electronic cigarette 501 to the user terminal 502. Particularly, the correlation between the electronic cigarette 501 and the user terminal 502 is established by the electronic cigarette 501 through Bluetooth, WIFI, infrared or NFC.

The user terminal 502 in this embodiment may be a mobile phone, a personal computer, a laptop, a tablet computer, or other types of terminal, which is not limited in detail here.

In this embodiment, the behavior characteristic of the user may be detected by the electronic cigarette 501, so as to analyze a current behavior of the user, for example, the user is smoking, the user is going to smoke, or the user turns off the electronic cigarette, which is not limited in detail here.

In this embodiment, after detecting the behavior characteristic of the user, the electronic cigarette 501 may judge whether the user is smoking.

It should be noted that whether the user is smoking may be judged by the electronic cigarette 501 in many manners. For example, the determination may be made according to the operating condition of an atomizer assembly in the electronic cigarette 501. When the atomizer assembly is operating, it may be determined that the user is smoking.

Alternatively, the determination may be made according to the operating condition of a sensor in the electronic cigarette 501. When the sensor is operating, it may be determined that the user is smoking.

Alternatively, the determination may be made according to the consumption rate of a battery in the electronic cigarette 501. When the battery consumption rate is larger than a threshold, it may be determined that the user is smoking.

The sensor in this embodiment may be an airflow sensitive switch or a key switch, or other types of switch, which is not limited in detail here. The key switch may be a light-touch switch, a sensitive switch or other types of switch, which is not limited in detail here either.

It should be understood that whether the user is smoking the electronic cigarette may be judged by the electronic cigarette 501 in many other manners in practice, which is not limited in detail here.

If the electronic cigarette 501 detects that the user is smoking, it is determined that the behavior characteristic of the user satisfies a reporting condition, and the triggering signal for indicating the user is smoking is generated by the electronic cigarette 501.

Particularly, a pulse signal is generated and is transmitted to a processor in the electronic cigarette 501 by the sensor in the electronic cigarette 501; and the triggering signal is generated by the processor in the electronic cigarette 501 according to the pulse signal, for indicating that the user is smoking.

The triggering signal may be transmitted by the electronic cigarette 501 to a user terminal 502 previously bound to the electronic cigarette 501 after the triggering signal is generated.

It should be noted that the electronic cigarette may further detect the client application in the user terminal 502 bound to the electronic cigarette 501 after generating the triggering signal in practice.

If the electronic cigarette 501 determines that the client application in the user terminal 502 does not operate, it indicates that the user closes the client application, the user terminal 502 is not started up, or the user terminal 502 is located in an area without network signal coverage. The data communication between the electronic cigarette 501 and the user terminal 502 can not be achieved. The electronic cigarette 501 may stop operating and end the current process.

If the electronic cigarette 501 determines that the client application in the user terminal 502 operates, it indicates that the electronic cigarette 501 is enabled to perform data communication with the user terminal, and the triggering signal may be transmitted to the user terminal 502 by the electronic cigarette 501.

In this embodiment, the electronic cigarette 501 may transmit a client detecting massage to the user terminal 502, then judge whether a client response message replied by the user terminal 502 is received; and determine that the client application in the user terminal 502 operates if the client response message replied by the user terminal 502 is received, or determine that the client application in the user terminal 502 does not operate if the client response message replied by the user terminal 502 is not received.

Whether the client application in the user terminal 502 operates may be judged by the electronic cigarette 501 in many other manners in practice, which is not limited in detail here.

After receiving the triggering signal transmitted by the electronic cigarette 501, the user terminal 502 may perform positioning and transmit the position information of the user terminal to the service platform 503.

In this embodiment, the user terminal 502 may start up a positioning function to obtain the latitude and longitude of the user terminal, or start up a map service API (for example, Google Maps or Apple Maps) to obtain the latitude and longitude of the user terminal. When starting up to the map service API to obtain the latitude and longitude of the user terminal, the following steps (1) to (3) may be performed.

In step (1), the map service API in the user terminal is started up.

In step (2), data returned by the map service API is obtained.

In step (3), whether the data is successfully obtained is judged; if the data is successfully obtained, the obtained latitude and longitude is stored and taken as present position information; if the data is not successfully obtained, last stored data is taken as the a present position information.

In this embodiment, after receiving the position information transmitted by the plurality of user terminals 502, the service platform 503 may judge whether a distance between the user corresponding to the user terminal 502 and other user is smaller than a preset distance according to the position information transmitted by the user terminal 502.

The group message may be pushed to the user terminal 502 of the user if the service platform 503 determines the distance between the plurality of users corresponding to the user terminals 502 is smaller than a preset distance according to the positioning result transmitted by each user terminal 502.

The group message in this embodiment may be same or corresponding promotion information or game data, which will not be defined in detail here.

In this embodiment, if an APP program corresponding to the electronic cigarette is installed on the user terminal 502, the group message may be pushed to the APP program by the service platform 503 and the group message is presented to the user by the APP program; and if the user terminal 502 has no APP program installed thereon, the group message may be pushed to other programs (for example, a browser) originally installed on the user terminal 502 and the group message may be presented by these programs, which will not be defined in detail here.

It should be noted that the process of the service platform 503 pushing the group message to the user terminal 502 in this embodiment is described in the following steps (1) to (3).

In step (1), the distance between individuals in a group and the number of individuals in the group is calculated by the service platform 503.

Particularly, the service platform 503 may calculate the distance between the user terminals whose positioning result is received during a certain period of time according to the positioning result, set a center position, and determine that the user, the distance from whom to the center position is less than a preset distance, meet a distance condition, then determine the number of those user.

In step (2), a massage is pushed by the service platform 503.

Particularly, the service platform 503 may push a specific massage to the user terminal 502 in a specific position according to the position of the user.

In step (3), the massage is received by the user terminal 502.

Particularly, the user terminal 502 detects the pushing by the service platform and obtains the pushed information.

Other operation may be performed if the service platform 503 determines the distance between the plurality of users corresponding to those user terminals 502 is larger than or equal to a preset distance according to the positioning result transmitted by each user terminal 502. For example, different message may be transmitted to the user terminal 502 of each user, or no message is transmitted, which will not be defined in detail here.

In this embodiment, the electronic cigarette 501 is configured to detect the behavior characteristic of the user, and generate the triggering signal and transmit the triggering signal to the user terminal 502 bound to the electronic cigarette 501when the behavior characteristic of the user meets the preset condition. The user terminal is configured to perform positioning and transmit the positioning result to the service platform 503. The service platform 503 is configured to judge whether the plurality of users meet an interaction condition according to the received positioning result; and push the group message to the user terminals 502 of the plurality of users if the plurality of users meet the interaction condition. That is, the service platform 503 may transmit the group message to the plurality of users who meet the interaction condition according to the positioning result of the user terminal 502 to facilitate the interaction between the plurality of users.

Further, in this embodiment, before transmitting the triggering signal, the electronic cigarette 501 may detect the client in the user terminal 502, and transmit the triggering signal only when the client in the user terminal 502 is in a standby state, thereby the effectiveness of transmitting data may be ensured and the power consumption may be reduced.

The invention claimed is:

1. An information pushing method, comprising:
   detecting, by an electronic cigarette, a behavior characteristic of a user;
   generating, by the electronic cigarette, a triggering signal if the behavior characteristic of the user satisfies a preset condition;
   transmitting, by the electronic cigarette, the triggering signal to a user terminal bound to the electronic cigarette;
   performing positioning, by the user terminal, and transmitting position information of the user terminal to a service platform; and
   judging, by the service platform, whether the user satisfies an interaction condition according to the received position information; and pushing a group message to the user terminal, if the user satisfies the interaction condition.

2. The method according to claim 1, further comprising:
   judging, by the electronic cigarette, whether the user is smoking; and
   determining that the behavior characteristic of the user satisfies the preset condition, if the user is smoking.

3. The method according to claim 2, wherein generating, by the electronic cigarette, a triggering signal comprises:
   generating, by a sensor in the electronic cigarette, a pulse signal and transmitting the pulse signal to a processor in the electronic cigarette; and
   generating, by the processor in the electronic cigarette, a triggering signal according to the pulse signal, for indicating that the user is smoking.

4. The method according to claims 3, wherein the sensor is an airflow sensitive switch or a key switch; and
   wherein the key switch is a light-touch switch or a sensitive switch.

5. The method according to claim 1, wherein before transmitting, by the electronic cigarette, the triggering signal to a user terminal bound to the electronic cigarette, the method further comprises:
   judging, by the electronic cigarette, whether a client application in the user terminal is operating; and triggering the electronic cigarette to transmit the triggering signal to the user terminal bound to the electronic cigarette, if the client in the user terminal is operating.

6. The method according to claim 5, wherein judging, by the electronic cigarette, whether a client application in the user terminal is operating comprises:
   transmitting, by the electronic cigarette, a client detecting massage to the user terminal;
   judging, by the electronic cigarette, whether a client response message replied by the user terminal is received; and determining that the client application in the user terminal is operating, if the client response message replied by the user terminal is received.

7. The method according to claim 1, wherein judging, by the service platform, whether the user satisfies an interaction condition according to the received position information comprises:
   judging, by the service platform, whether a distance between the user and other user is smaller than a preset distance according to the position information; and determining that the user satisfies the interaction condition, if the distance between the user and other user is smaller than the preset distance.

8. The method according to claim 1, further comprising:
   collecting, by the electronic cigarette, a smoking parameter of the user, and transmitting the smoking parameter to the user terminal, if the behavior characteristic of the user satisfies the preset condition.

9. The method according to claim 8, wherein before performing positioning, by the user terminal, the method further comprises:
   judging, by the user terminal, whether a difference between a time when the user last smokes and a current time is smaller than a preset value according to the smoking parameter; and triggering the user terminal to perform the positioning, if the difference between the time when the user last smokes and the current time is smaller than the preset value; or
   judging, by the user terminal, whether a frequency of the user smoking in a predetermined period of time is larger than a preset value according to the smoking parameter; and triggering the user terminal to perform the positioning, if the frequency of the user smoking in the predetermined period of time is larger than the preset value.

10. The method according to claim 8, wherein after collecting, by the electronic cigarette, a smoking parameter of the user, and transmitting the smoking parameter to the user terminal, the method further comprises:
    transmitting, by the user terminal, the smoking parameter to the service platform;
    wherein judging, by the service platform, whether the user satisfies an interaction condition according to the received position information comprises:
    judging, by the service platform, whether the user satisfied the interaction condition according to the smoking parameter and the position information.

11. The method according to claim 10, wherein judging, by the service platform, whether the user satisfies an interaction condition according to the smoking parameter and the position information comprises:
    judging, by the service platform, whether a distance between the user and other user is smaller than a preset distance according to the position information, judging whether a difference between a time when the user last smokes and a current time is smaller than a preset value according to the smoking parameter if the distance between the user and other user is smaller than the preset distance according to the position information, and determining that the user satisfies the interaction condition if the difference between the time when the user last smokes and the current time is smaller than the preset value; or
    judging, by the service platform, whether a distance between the user and other user is smaller than a preset distance according to the position information, judging whether a frequency of the user smoking in a predetermined period of time is larger than a preset value according to the smoking parameter if the distance between the user and other user is smaller than the preset distance according to the position information, and determining that the user satisfies the interaction condition if the frequency of the user smoking in the predetermined period of time is larger than the preset value.

12. The method according to claim 1, wherein pushing a group message to the user terminal of the user comprises:
    pushing, by the service platform, promotion information or game data to the user terminal.

13. The method according to claim 1, wherein the user terminal is a mobile phone, a personal computer, a laptop or a tablet computer.

14. A communication system, comprising:
an electronic cigarette, a user terminal and a service platform;
wherein the electronic cigarette is configured to detect a behavior characteristic of a user, generate a triggering signal if the behavior characteristic of the user satisfies a preset condition, and transmit the triggering signal to the user terminal bound to the electronic cigarette;
the user terminal is configured to perform positioning and transmit position information of the user terminal to the service platform; and
the service platform is configured to judge whether the user satisfies an interaction condition according to the received position information ; and push a group message to the user terminal if the user satisfies the interaction condition.

15. The communication system according to claim 14, wherein the electronic cigarette comprises a sensor and a processor;
wherein the sensor is configured to generate a pulse signal and transmit the pulse signal to the processor when the user is smoking; and
the processor is configured to generate the triggering signal according to the pulse signal, for indicating that the user is smoking.

16. The communication system according to claim 15, wherein the sensor is an airflow sensitive switch or a key switch; and
wherein the key switch is a light-touch switch or a sensitive switch.

17. The communication system according to claim 14, wherein the electronic cigarette is further configured to collect a smoking parameter of the user and transmit the smoking parameter to the user terminal if the behavior characteristic of the user satisfies the preset condition.

18. The communication system according to claim 17, wherein the user terminal is further configured to judge whether a difference between a time when the user last smokes and a current time is smaller than a preset value according to the smoking parameter, and trigger the user terminal to perform the positioning if the difference between the time when the user last smokes and the current time is smaller than the preset value; or
the user terminal is further configured to judge whether a frequency of the user smoking in a predetermined period of time is larger than a preset value according to the smoking parameter, and trigger the user terminal to perform the positioning if the frequency of the user smoking in the predetermined period of time is larger than the preset value.

19. The communication system according to claim 17, wherein the user terminal is further configured to transmit the smoking parameter to the service platform; and
the service platform is configured to judge whether the user satisfies the interaction condition according to the smoking parameter and the received position information.

20. The communication system according to claim 14, wherein the user terminal is a mobile phone, a personal computer, a laptop or a tablet computer.

* * * * *